US008569907B2

(12) United States Patent
O'Gorman et al.

(10) Patent No.: US 8,569,907 B2
(45) Date of Patent: *Oct. 29, 2013

(54) SINGLE TRANSISTOR ALTERNATOR FIELD BUCK/BOOST

(75) Inventors: Patrick A. O'Gorman, Grayslake, IL (US); Dennis L. Stephens, Barrington, IL (US)

(73) Assignee: Continental Automotive Systems, Inc., Auburn Hill, MI (US)

( * ) Notice: Subject to any disclaimer, the term of this patent is extended or adjusted under 35 U.S.C. 154(b) by 1106 days.

This patent is subject to a terminal disclaimer.

(21) Appl. No.: 11/200,931

(22) Filed: Aug. 10, 2005

(65) Prior Publication Data

US 2007/0007818 A1    Jan. 11, 2007

Related U.S. Application Data

(60) Provisional application No. 60/698,162, filed on Jul. 11, 2005.

(51) Int. Cl.
  *B60L 1/00*  (2006.01)
  *B60L 3/00*  (2006.01)
  *H02G 3/00*  (2006.01)

(52) U.S. Cl.
  USPC ........................................................ 307/10.1

(58) Field of Classification Search
  USPC ........................................................ 307/1, 10.1
  See application file for complete search history.

(56) References Cited

U.S. PATENT DOCUMENTS

| | | | | |
|---|---|---|---|---|
| 4,410,848 | A | | 10/1983 | Frierdich .......................... 322/25 |
| 5,594,322 | A | * | 1/1997 | Rozman et al. .................. 322/10 |
| 5,946,202 | A | | 8/1999 | Balogh ............................ 363/26 |
| 5,973,482 | A | * | 10/1999 | Meinert ........................... 322/86 |
| 7,095,214 | B2 | * | 8/2006 | O'Gorman et al. ............. 322/28 |
| 7,116,081 | B2 | * | 10/2006 | Wilson ............................ 322/33 |
| 2002/0149347 | A1 | * | 10/2002 | Asada ............................. 322/28 |

* cited by examiner

*Primary Examiner* — Carlos Amaya

(57) ABSTRACT

Disclosed herein is an electrical system topology for voltage regulation in a 12-volt vehicle power distribution system. Particularly, a single transistor power converter is configured to operate in both as a traditional voltage regulator mode (i.e., as buck converter to reduce the field voltage applied to an alternator to a value less than that available from the main bus) and as an alternator field current boost converter (i.e., as a boost converter to boost the field voltage applied to an alternator to a value greater than that available from the main bus). The converter may also include a controller that incorporates a thermal model of the alternator to limit the amount of voltage boost applied and/or direct temperature measurement of the alternator or alternator components. Additionally, these two approaches may be combined such that measured temperatures are used to refine the temperature estimated by the thermal estimator.

16 Claims, 1 Drawing Sheet

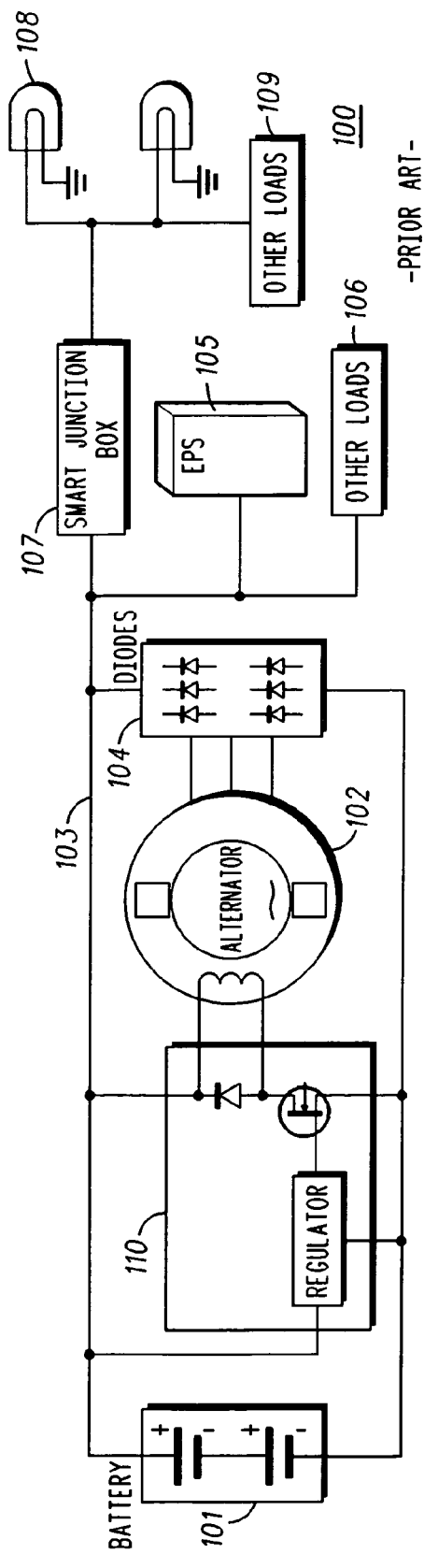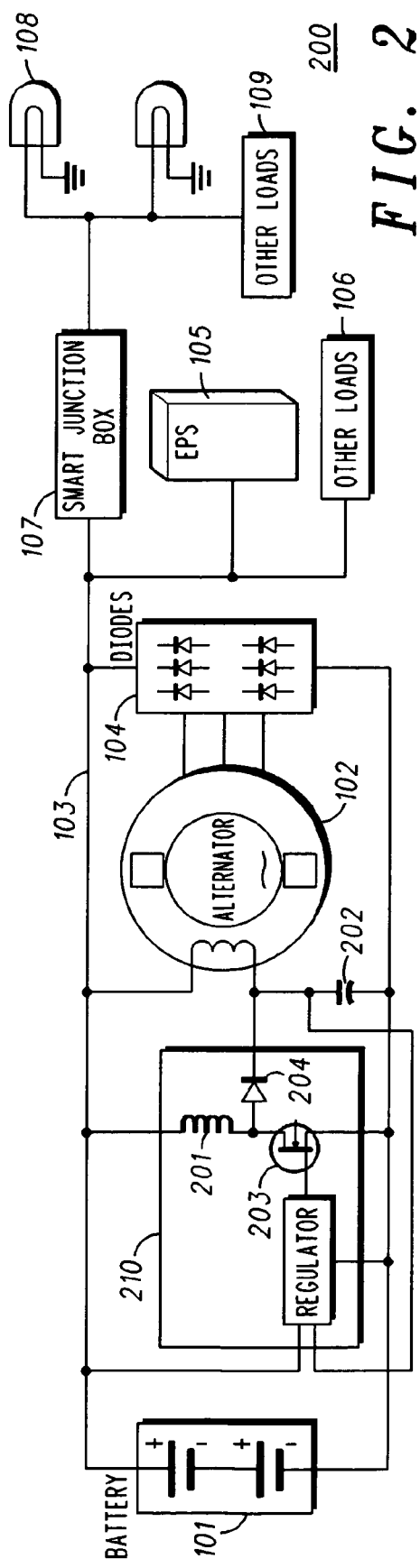

SINGLE TRANSISTOR ALTERNATOR FIELD BUCK/BOOST

CROSS REFERENCE TO RELATED APPLICATIONS

This application is related to and hereby claims priority to provisional U.S. Patent Application 60/698,162, filed Jul. 11, 2005, titled "Single Transistor Alternator Field Buck/Boost," having the inventors as identified herein, which provisional application is hereby incorporated by reference in its entirety.

FIELD OF THE INVENTION

This invention relates to automotive electrical systems. More particularly, the invention relates to configurations of automotive electrical power systems adapted for use with high power loads.

BACKGROUND

The 12-volt systems used in today's automobiles are required to supply ever increasing currents as the load on the system continues to increase. This increase is due to a combination of increasing numbers of electronic devices, such as communication, entertainment, and telematics systems, as well as the proliferation of electric powered auxiliary systems to replace traditional hydraulic or mechanical powered systems. To reduce the amount of current required to supply these higher loads, it has been proposed that automobiles should adopt 42-volt electrical systems. The automotive industry, however, has been reluctant to transition to 42-volt electrical systems because of increased costs. Consequently, there is a strong demand to improve the performance of 12-volt systems, thereby allowing higher electrical loads to operate effectively with conventional vehicle electrical systems.

The available output current from typical automotive alternators is determined in significant part by the speed at which the alternator is operating. Because alternators are driven off the engine, the alternator operating speed is a direct function of engine speed. For example, an alternator that produces a current of 135 amperes at an engine speed of 3,000 rpm may only produce 60 amperes at an engine idle speed of 600 rpm.

Most electrical loads in an automobile are insensitive to engine speed, such as rear window defoggers, heated seats, lights, etc. Conversely, the automotive electrical loads that are sensitive to engine speed do not consume significant current, for example, the ignition system. As a result, an automotive electrical system may be in significant current deficit when the engine is at idle. This current deficit may result in temporary voltage dips on the 12-volt bus. When this voltage dip occurs, a variety of objectionable performance is experienced from various electrical systems, for example dimming of the vehicle lights.

A variety of solutions to this problem in vehicle electrical system have been proposed. For example, U.S. Pat. No. 5,973,482 describes a voltage regulator that is fed by a standard boost converter circuit and produces the desired increase in field voltage. The number of components in the required circuit, however, increases the cost of the circuit rendering it less desirable than the circuits disclosed herein. Additionally, the feedback loop of the '482 patent is more complicated than the circuits described herein because the boost output voltage is fed back to the boost control, while regulation of the output is still performed by the regulator.

U.S. Pat. No. 4,410,848 describes another solution to maintaining alternator excitation. The alternator disclosed in the '848 patent is a three phase AC output without rectifier diodes. The field winding is driven by the rectified output voltage. Then a large load is applied, the output voltage collapses, thereby collapsing the field voltage as well. The '848 patent discloses an arrangement of current transformers to maintain field current when the output voltage collapses. This system requires additional components (current transformers) rather than the boost circuits described herein, which increases cost of the solution and is therefore less desirable.

Finally, U.S. Pat. No. 5,946,202 describes techniques for boosting alternator output using switches (e.g., field effect transistors (FETs)) to short the alternator outputs to ground at high frequencies, thereby using the line inductance as an energy storage element. All of the alternator output power is switched through the three FETs, which replace the rectifier diodes. Again, this solution requires substantial additional cost and complexity over the circuitry described herein.

Thus, disclosed herein are circuits and methods for minimizing the above-mentioned drawbacks and while still solving or at least minimizing the problems of maintaining alternator voltage.

BRIEF DESCRIPTION OF THE DRAWINGS

Embodiments of the inventive aspects of this disclosure will be best understood with reference to the following detailed description, when read in conjunction with the accompanying drawings, in which:

FIG. 1 illustrates an exemplary prior art vehicle electrical system.

FIG. 2 illustrates a vehicle electrical system employing a single transistor boost converter/voltage regulator embodying certain teachings of the present disclosure.

DETAILED DESCRIPTION

Disclosed herein is an electrical system topology for voltage regulation in a 12-volt vehicle power distribution system. Particularly, a single transistor power converter is configured to operate in both as a traditional voltage regulator mode (i.e., as buck converter to reduce the field voltage applied to an alternator to a value less than that available from the main bus) and as an alternator field current boost converter (i.e., as a boost converter to boost the field voltage applied to an alternator to a value greater than that available from the main bus). The converter may also include a controller that incorporates a thermal model of the alternator to limit the amount of voltage boost applied and/or direct temperature measurement of the alternator or alternator components. Additionally, these two approaches may be combined such that measured temperatures are used to refine the temperature estimated by the thermal estimator.

With reference to FIG. 1, a prior art automotive electrical power system 100 is disclosed. Automotive electrical system 100 has two power sources: battery 101 and alternator 102. Battery 101 is, in many automotive applications, a conventional lead acid battery, although various other battery types may also be used. During normal vehicle operation, battery 101 does not supply steady state energy to bus 103 and the loads connected thereto. The electrical energy required for normal vehicle operation is provided by alternator 102, assuming that the capacity of the alternator is sufficient to provide the required power. If this power cannot be supplied by the alternator, power is drawn from the battery. In addition, battery 101 is available to provide power to the various electrical loads when the vehicle is not in operation.

Alternator 102 is typically a wound field alternator of a type known to those skilled in the art. Current flows from alternator 102 to bus 103 through rectifier bank 104. The rectifier bank may comprise one or more diodes, as is typical, or may comprise controlled switched rectifiers such as transistors, e.g., field effect transistors (FETs), or silicon controlled rectifiers (SCRs). Additionally, both alternator 102 and rectifier bank 104 may be either single phase or multi-phase.

During normal vehicle operation, battery 101 is charged from bus 103. Battery charging current may be left uncontrolled, as is typical, or voltage regulator 110 may be configured to regulate the charge current and voltage supplied to the battery. In normal operation, however, voltage regulator 110 is operative to keep the voltage of the bus 103 at a nearly constant value. This is necessary because the output voltage of alternator 102 varies with engine speed and the electrical load connected to the bus 103. Design of various voltage regulator circuits is well known to those skilled in the art, and thus is not addressed in detail here.

Both sources supply power to main bus 103. A variety of loads are connected to bus 103. Additional loads may include, for example, electric power steering system 105, and other loads 106. Also coupled to the main bus is a smart junction box 107, which supplies power to critical loads, such as the headlights 108 and other loads 109. Operation of the smart junction box 107 is described in Applicants' co-pending patent application Ser. Nos. 10/921,009 and 10/927,687, filed Aug. 18, 2004 and Aug. 27, 2004, respectively, which are hereby incorporated by reference in their entirety.

As noted above, when the engine is operating at relatively low speeds, for example at or near idle, the output current rating of the alternator is compromised. When the alternator is unable to produce the required current, the voltage of bus 103 decreases, which further compromises the voltage available to the field winding of alternator 102 when using conventional voltage regulators of the prior art. The end result of this scenario is voltage dip on main bus 103, which may cause undesired effects, such as the dimming of headlights 108.

The output current of the alternator at engine idle speed is limited by the current flowing in the alternator field winding and by the established magnetic flux in the airgap between the rotor and stator. Under an idle condition, the battery is supplying current to the electrical system, and the alternator field current is limited to the value determined by the field voltage and field winding resistance. An increase in field voltage will increase the field current and consequently increase the output current of the alternator. This may be accomplished by reconfiguring the regulator circuit as illustrated in FIG. 2.

FIG. 2 illustrates an automotive electrical system 200, which is like that of FIG. 1, and in which like items have the same reference numbers as FIG. 1. Additional components include boost inductor 201 (which is part of voltage regulator 210) and capacitor 202. As is known to those skilled in the art, a conventional boost converter includes a transistor (switching device), a boost inductor, and a blocking diode. In accordance with the teachings herein, the added inductor 201 may function as a boost inductor with the transistor and diode needed for boost converter operation being provided by components already present in the voltage regulator. This configuration does not limit operation of the circuit when operating in buck mode (as a conventional voltage regulator) or in the boost mode to increase the field current during low speed operation. Additionally, although the disclosure herein refers to a single switching transistor, it is understood that this is meant topologically, rather than as a limited number of discrete components. For example, a single switching transistor in the context of this disclosure may be constructed from multiple individual transistors configured to function as one switch, e.g., a Darlington transistor. In general, it is preferred to use a single FET of the metal oxide semiconductor construction (MOSFET).

One end of the field winding of the alternator is connected to the main bus, which is at battery (or alternator output) voltage. This end is referred to herein as the hard-connected end. The other end of the alternator field winding is regulated by a chopper circuit (i.e., the traditional voltage regulator) to ground. This end of the field winding is referred to herein as the switched end. The regulator circuit described herein thus boosts the switched end of the field winding above the battery voltage to cause a field current to flow. The amount of voltage boost applied to the switched end of the field winding determines the amount of field current that flows in the winding.

Capacitor 202 serves the function of energy storage between cycles of the switch element 203. Diode 204 rectifies the switching end to provide DC voltage across the field coil at a voltage substantially higher than the battery voltage. The adjustment of the voltage across capacitor 202 is determined by the duty cycle of the switching element 203. This duty cycle is controlled by various feedback methods. One such method shown (illustrated in FIG. 2) is feedback from the bus 103 (i.e., bus voltage is the feedback parameter). Alternatively, or in addition, alternator temperature measurement or temperature estimation may also be used as control parameters. Anticipation of engine speed is another control parameter that may be used to control the duty cycle of switching element 203. As is known to those skilled in the art, the alternator is slow to respond because of the high field coil inductance. As the engine changes speed, the regulator described herein could anticipate the change in engine speed through a feed forward parameter and modify the duty cycle before the engine speed has changed. Throttle position could also be one of the inputs in addition as well as engine rpm.

To produce a field current equal to the maximum value of field current produced by a conventional alternator/regulator configuration, the switched end is boosted to twice the battery voltage (so that a voltage equal to the battery voltage appears across the field winding). In the conventional case, the duty cycle of the switching transistor in the regulator would be at 100% to put the full battery voltage across the field winding, effectively limiting the alternator's output current for a given speed. Conversely, the regulator configuration illustrated in FIG. 2 only requires the switching transistor to have a duty cycle of about 50% (ignoring circuit losses). Thus, it is possible, when using the regulator described herein, by increasing the duty cycle above 50% to obtain significantly greater voltage boost than is possible with a conventional voltage regulator. This increases the field current, and thus the output current, available from the alternator at a given speed. Consequently, the field current and alternator output current are increased beyond those values obtained with the conventional regulator.

Although the amount of voltage boost that may be applied to the field winding is theoretically limited only by the size of the boost inductor and the switching frequency of the transistor, the alternator's field current (and thus output current) cannot be increased indefinitely because of alternator thermal constrains. In a preferred embodiment, a thermal model of the alternator may be used to estimate the rotor and stator winding temperatures. This temperature can be used to control the duty cycle of the switching transistor, thereby operating the alternator within its maximum temperature values. In general, the higher the level of alternator field current and output current, the shorter the time this current can flow. As will be appreciated by one skilled in the art, the thermal estimator may be implemented using various combinations of analog and/or digital programmable circuitry or controllers.

As an alternative to estimation of the alternator rotor and stator temperature, actual temperature feedback may be used, either in addition to or in place of thermal modeling. For example, direct rotor and stator temperature measurements may be fed back into the control circuit. Alternatively, measurements of heat sink temperature, etc. may be used to refine the temperature estimation derived by the controller using the alternator thermal model. Numerous variations of such circuits and measuring devices (e.g., thermistors, etc.) would be apparent to one skilled in the art having benefit of this disclosure and are thus not discussed here in detail.

Additionally, the output of the boost circuit is not explicitly needed in the feedback loop, as the alternator output voltage is used instead. The boost output, however, should preferably be monitored in case the connection to the alternator field or alternator output is lost. If either of these connections were lost, the boost would continue to increase the voltage supplied to the field because the alternator output would be (or appear to be) zero. Thus, the boost output is monitored to ensure that the voltage applied to the field winding does not exceed a predetermined maximum value. Should this occur, the voltage applied to the alternator field winding could be limited or simply shut down.

It should be understood that the inventive concepts disclosed herein are capable of many modifications, combinations and sub-combinations. To the extent such permutations fall within the scope of the appended claims and their equivalents, they are intended to be covered by this patent.

What is claimed is:

1. An automotive electrical system comprising:
   a main bus;
   a battery providing a battery voltage and which is provided to the main bus;
   a capacitor having first and second sides; and
   an alternator connected to the main bus through a rectifier bank and controlled by a voltage regulator, the alternator having a field winding with first and second ends, the first end being connected to the main bus, the second end being coupled to the first side of the capacitor, the second side of the capacitor being coupled to a reference potential;
   wherein the voltage regulator comprises a buck/boost circuit connected to the second end of the field winding and to the first side of the capacitor, the buck/boost circuit and capacitor being configured to be capable of supplying a voltage to the second end of the field winding that is greater than seven-tenths of a volt more than the battery voltage of the battery.

2. The automotive electrical system of claim 1 wherein the buck/boost circuit comprises a boost inductor having a first end coupled to the main bus and a second end coupled to both: 1) the second end of the field winding through a diode and 2) a reference potential through a switching transistor;
   wherein the boost inductor and single switching transistor are configured to charge the first side of the capacitor to a voltage greater than the battery voltage by switching current that passes through the boost inductor.

3. The automotive electrical system of claim 2 wherein a controller of the voltage regulator is configured to increase the supplied field voltage as a function of engine speed or throttle position.

4. The automotive electrical system of claim 1 wherein a controller of the voltage regulator is configured to limit the supplied field voltage as a function of alternator temperature.

5. The automotive electrical system of claim 4 wherein the alternator temperature used by the controller to limit the supplied field voltage is one or more of: at least one estimated temperature computed by the controller; at least one measured temperature; or at least one estimated temperature wherein the estimation includes as a parameter used for estimation at least one measured temperature.

6. The automotive electrical system of claim 1 wherein a controller of the voltage regulator is configured to increase the supplied field voltage as a function of engine speed or throttle position.

7. The automotive electrical system of claim 1 wherein a feedback path for the controller includes an output voltage of the alternator and an output voltage of the boost converter and wherein the output voltage of the alternator is used to control a field voltage applied to the alternator while the output voltage of the boost converter is used to limit the field voltage applied to the alternator.

8. The automotive electrical system of claim 1, wherein the voltage regulator and the buck/boost circuit are configured to provide to the second end of the field winding a voltage that can be equal to or greater than twice the battery voltage.

9. The automotive electrical system of claim 8 wherein a feedback path for the controller includes an output voltage of the alternator and an output voltage of the boost converter and wherein the output voltage of the alternator is used to control a field voltage applied to the alternator while the output voltage of the boost converter is used to limit the field voltage applied to the alternator.

10. A voltage regulator for an automotive electrical system comprised of an alternator having a field winding with first and second ends, the voltage regulator comprising:
    a switching transistor; a capacitor having first and second sides;
    a controller, wherein the controller is configured to operate the switching transistor as a boost converter that supplies to the first end of the alternator field winding, an alternator field voltage greater than a main bus voltage, while the second end of the field winding is coupled to the main bus voltage; the second end being coupled to the first side of the capacitor, the second side of the capacitor being couple to a reference potential;
    wherein the voltage at the first end of the alternator field winding is controlled by the controller to be capable of being greater than seven-tenths of a volt greater than the main bus voltage.

11. The voltage regulator of claim 10 wherein the controller is further configured to limit the alternator field voltage as a function of an alternator temperature.

12. The voltage regulator of claim 11 wherein the alternator temperature used by the controller to limit the supplied field voltage is one or more of: at least one estimated temperature computed by the controller; at least one measured temperature; or at least one estimated temperature wherein the estimation includes as a parameter used for estimation at least one measured temperature.

13. The voltage regulator of claim 12 wherein a feedback path for the controller includes an output voltage of the alternator and an output voltage of the boost converter and wherein the output voltage of the alternator is used to control a field voltage applied to the alternator while the output voltage of the boost converter is used to limit the field voltage applied to the alternator.

14. The voltage regulator of claim 11 wherein a feedback path for the controller includes an output voltage of the alternator and an output voltage of the boost converter and wherein the output voltage of the alternator is used to control a field voltage applied to the alternator while the output voltage of the boost converter is used to limit the field voltage applied to the alternator.

15. The voltage regulator of claim 10 wherein a controller of the voltage regulator is configured to increase the supplied field voltage as a function of engine speed or throttle position.

16. The voltage regulator of claim 10 wherein a feedback path for the controller includes an output voltage of the alternator and an output voltage of the boost converter and wherein the output voltage of the alternator is used to control a field voltage applied to the alternator while the output voltage of the boost converter is used to limit the field voltage applied to the alternator.

* * * * *